H. ZIEMSS, Jr.
BRAKE BEAM.
APPLICATION FILED MAY 18, 1910.
1,045,928.
Patented Dec. 3, 1912.
2 SHEETS—SHEET 2.
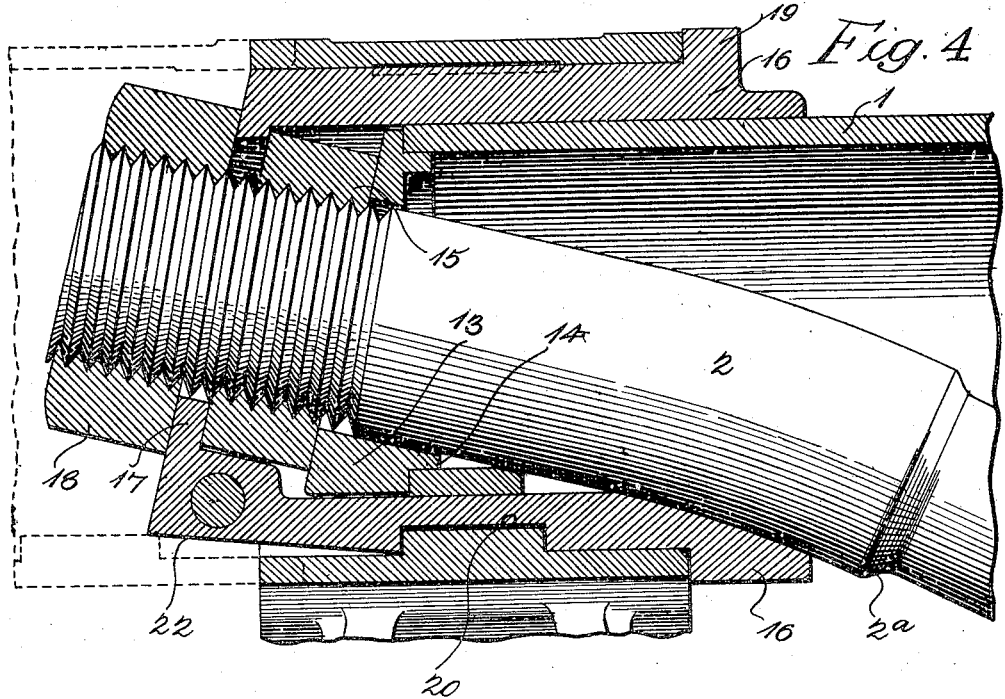
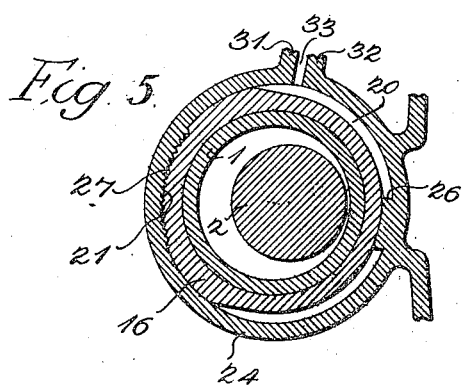
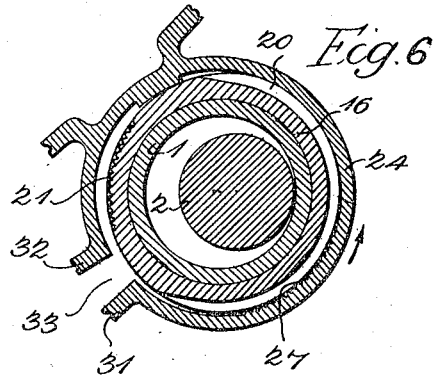
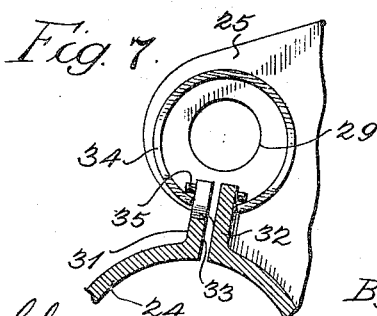
Witnesses:
J. C. Devick.
George L. Chindahl
Inventor:
Henry Ziemss, Jr.
By Luther L. Miller
Attorney.

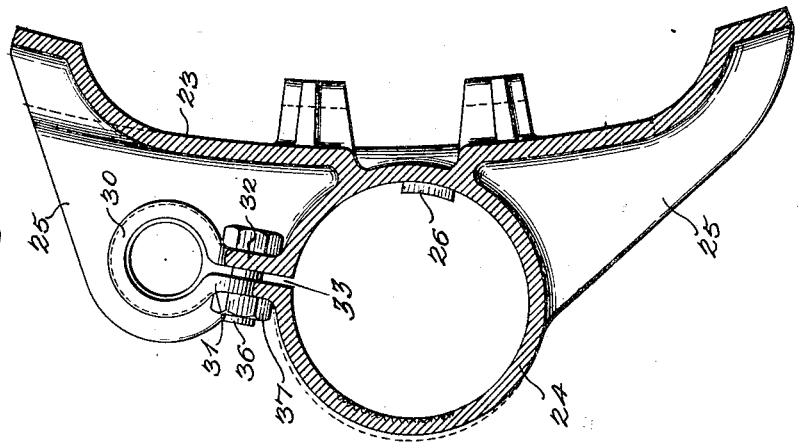
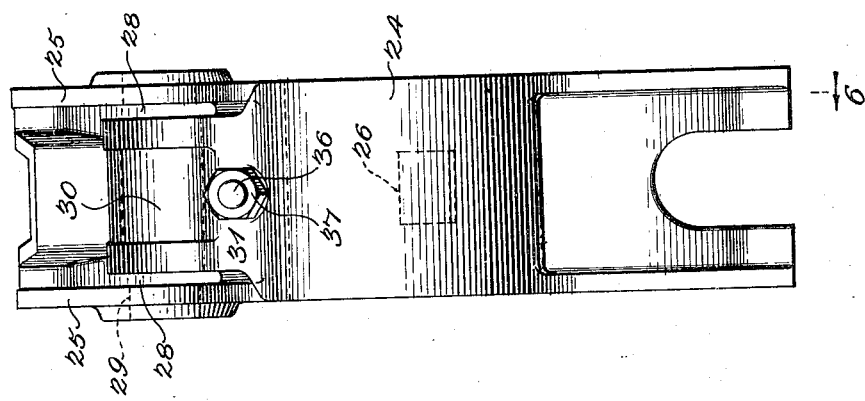
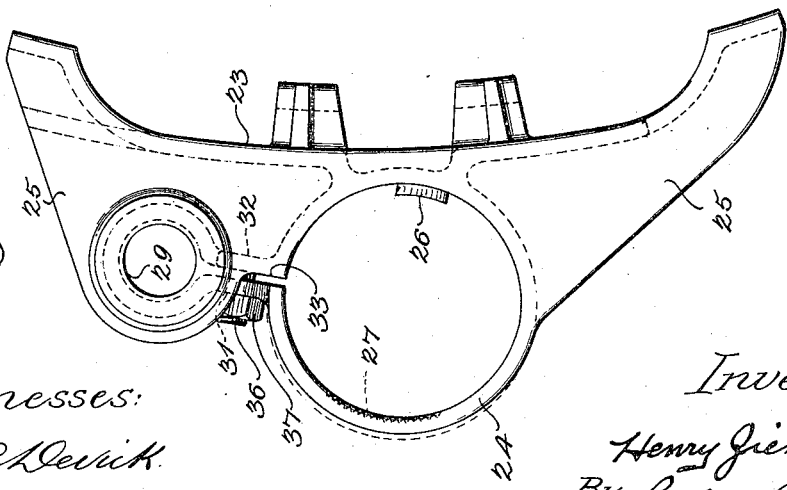

UNITED STATES PATENT OFFICE.

HENRY ZIEMSS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM.

1,045,928.

Specification of Letters Patent.

Patented Dec. 3, 1912.

Application filed May 18, 1910. Serial No. 561,957.

*To all whom it may concern:*

Be it known that I, HENRY ZIEMSS, Jr., a citizen of the United States, residing at Chicago, in the county of Cook and State of Illinois, have invented certain new and useful Improvements in Brake-Beams, of which the following is a specification.

One of the objects is to provide an improved connection between the brake head and the beam.

A further object is to improve the means for holding the brake head in adjusted angular position upon the beam.

In the accompanying drawings, Figures 1 and 2 are side and end views, respectively, of a brake head embodying the features of my invention. Fig. 3 is a section through the brake head on line 6—6 in Fig. 2. Fig. 4 is a sectional view illustrating the construction of the ends of the brake beam and the connection between the beam and the brake head. Figs. 5 and 6 are sectional views illustrating the manner of connecting and disconnecting the brake head and the beam. Fig. 7 is a fragmental detail of an alternative construction.

In the periphery of the sleeve 16, which is arranged upon the ends of the compression member 1 and tension member 2, is a groove 20 extending part way around the sleeve, the bottom of the groove at the ends thereof merging in the periphery of the sleeve. Said groove is formed in the forward side of the sleeve. Upon the rear side of the sleeve may be formed a series of shallow corrugations 21. At the forward side of the sleeve 16 and at the outer end thereof is an inclined surface 22 leading from the outer end of the sleeve up to the groove 20.

The brake head which I have selected to illustrate the invention is a casting comprising the face 23, the hub 24 and the side flanges 25. Said hub is adapted to be slipped upon the sleeve 16. Upon the inner periphery of the hub, and in this instance, at the forward side thereof, is a boss 26 adapted to fit within the groove 20. Upon the inner periphery of said hub 24 at the rear side thereof may be formed a series of corrugations 27 to mesh with the corrugations 21 on the sleeve 16 and thus assist to hold the brake head yieldingly in place upon the beam.

The brake head is provided with an eye to receive the usual brake hanger. The eye is usually a portion of the casting extending from one flange to the other. As herein shown, however, a slot 28 is formed through the eye adjacent each side of the flange, therefore the eye may be said to consist of the openings 29 in said side flanges and the portion 30, (Figs. 2 and 3). Said portion is connected with the hub by means of the webs 31 and 32, said webs being formed by providing an opening or slot 33 extending from the interior of the eye to the interior of the hub. It will thus be seen that the hub is split at one side, as represented in Figs. 1 and 3.

In casting the brake head, the hub is made of such diameter that when forced upon the sleeve 16 the hub shall be somewhat expanded, the elasticity of the metal thus causing the hub to embrace the sleeve with a degree of pressure depending upon the relative proportions of the parts. The eye portion 30, because of its circular form and its connection with the hub through the webs 31 and 32, yieldingly connects the split sides of the hub together.

If desired, the eye portion 30 may be dispensed with and the split sides of the hub resiliently connected together through the medium of an annular steel spring 34 (Fig. 7). Said spring, as herein shown, is in the form of a split ring, the ends of the ring bearing upon the webs 31 and 32, and the ring being held from displacement by means of the projections 35.

If desired, means may be provided for adjusting the clamping pressure of the hub 24 upon the sleeve, as, for example, a bolt 36 extending through the webs 31 and 32. Said bolt is provided with a nut 37. It will be understood that the bolt and nut constitute means for increasing the pressure of the hub to the point where the head is immovably secured upon the sleeve, if it be desired to fix the head in position.

When the brake head is to be placed upon the beam, the brake head is placed against the outer end of the sleeve with the boss 26 on the lower part of the inclined surface 22, as shown in Fig. 4. Said head may now be forced in a straight line onto the sleeve, the hub expanding as the boss 26 rides up the incline 22. When said boss has passed the highest point of the incline, it drops into the groove 20. The resiliency of the metal of the hub and the interengagement of the roughened surfaces 21 and 27 causes the brake head to be held in adjusted angular position upon the sleeve.

To remove the brake head, the head is rotated in the direction of the arrow in Fig. 6 to carry the boss 26 out of the groove 20 and onto the periphery of the sleeve. The head may now be withdrawn by a lateral movement of the head.

In Fig. 4 a washer 13 is mounted on the end of the tension member 2 and provided with an extension 14 forming a seat for the end of the compression member. A nut 15 secures the tension and compression members together. The sleeve 16 is arranged upon the end of the compression member and is provided with an inclined end wall 17 which bears against the nut 15. The nut 18 is screwed upon the outer end of the tension member to hold the sleeve 16 in place.

This construction just above described is not claimed in this application, but forms the subject matter of separate co-pending applications filed October 21, 1908, Serial No. 458,804, and a co-pending application filed February 12, 1912, Serial No. 677,035.

What I claim is:

1. A brake beam comprising a member having a groove extending around a portion of its periphery, one end of said groove merging into said periphery, and a brake head having a split hub adapted to fit on said member, said hub having a boss on its inner periphery adapted to lie in said groove on the side adjacent the shoe supporting portion of the head.

2. A brake beam comprising a member having a groove extending around a portion of its periphery, one end of said grove merging into said periphery, said member having an inclined surface extending from one end thereof to said groove, and a brake head having a split hub adapted to fit on said member, said hub having a boss on its inner periphery adapted to lie in said groove, said boss riding up said inclined surface when the brake head is being placed on said member.

3. A brake head having a hub and a hanger-attaching eye, webs extending between said hub and said eye, said webs having a slot between them connecting the interiors of said hub and said eye.

4. A brake head having a hub and a hanger-attaching eye, webs extending between said hub and said eye, said webs having a slot between them connecting the interiors of said hub and said eye, and means for drawing said webs together.

5. A brake beam comprising a member having corrugations on its periphery, a brake head comprising a hub fitting on said member and having corrugations upon its inner periphery adapted to engage the corrugations on said member, a hanger-attaching eye, and webs extending between said eye and said hub, said webs having a slot between them connecting said eye and said hub.

6. A brake beam comprising a sleeve having corrugations on its periphery, a brake head comprising a hub adapted to fit on said sleeve, said hub having corrugations on its inner periphery adapted to engage the corrugations on said sleeve, one side of said hub being split longitudinally, a hanger-attaching eye on said brake head, and webs extending between said eye and said hub and lying at opposite sides of the split in said hub, said webs having a slot between them extending from said eye to said split.

7. A brake beam comprising a sleeve having corrugations on its periphery, a brake head comprising a hub adapted to fit on said sleeve, said hub having corrugations on its inner periphery adapted to engage the corrugations on said sleeve, one side of said hub being split longitudinally, a hanger-attaching eye on said brake head, webs extending between said eye and said hub and lying at opposite sides of the split in said hub, said webs having a slot between them extending from said eye to said split, and means for drawing said webs together.

8. A brake head comprising a hub and a face having flanges at its sides, said flanges having openings therethrough, a hanger-attaching eye, webs connecting said eye with said hub, said webs having a slot between them connecting the eye with the interior of the hub, said eye coinciding with the openings in said flanges.

9. A brake head comprising a hub slotted to form a spring clamping portion, and a hanger attaching eye integral with the hub body and with the said clamping portion.

10. A brake head comprising a hub slotted to form a spring clamping portion, and a hanger attaching eye connected to the end of said clamping portion.

HENRY ZIEMSS, Jr.

Witnesses:
CHARLES ZIEMSS,
A. F. HAMMANN.